United States Patent
Maloney

(10) Patent No.: US 6,912,119 B2
(45) Date of Patent: Jun. 28, 2005

(54) SLIDING KEYBOARD TRAY SET

(75) Inventor: Eric W. Maloney, Jamestown, NY (US)

(73) Assignee: Weber Knapp Company, Jamestown, NY (US)

(*) Notice: Subject to any disclaimer, the term of this patent is extended or adjusted under 35 U.S.C. 154(b) by 129 days.

(21) Appl. No.: 10/387,081

(22) Filed: Mar. 12, 2003

(65) Prior Publication Data

US 2004/0179331 A1 Sep. 16, 2004

(51) Int. Cl.$^7$ ................................................. G06F 1/16
(52) U.S. Cl. ...................................... 361/680; 361/679
(58) Field of Search .................................. 361/679–680

(56) References Cited

U.S. PATENT DOCUMENTS 6,682,038 B2 * 1/2004 Golynsky .............. 248/346.01

* cited by examiner

Primary Examiner—Yean-Hsi Chang
(74) Attorney, Agent, or Firm—Simpson & Simpson, PLLC

(57) ABSTRACT

A keyboard support is provided with a sliding mouse support having a storage position arranged beneath the keyboard support and right and left hand use positions projecting from opposite ends of the keyboard support, wherein in each use position the mouse support is swingable forwardly and rearwardly of the keyboard support for purposes of adjustably arranging the mouse support within a range of user convenient mouse use positions relative to the front and rear edges of the keyboard support.

20 Claims, 4 Drawing Sheets

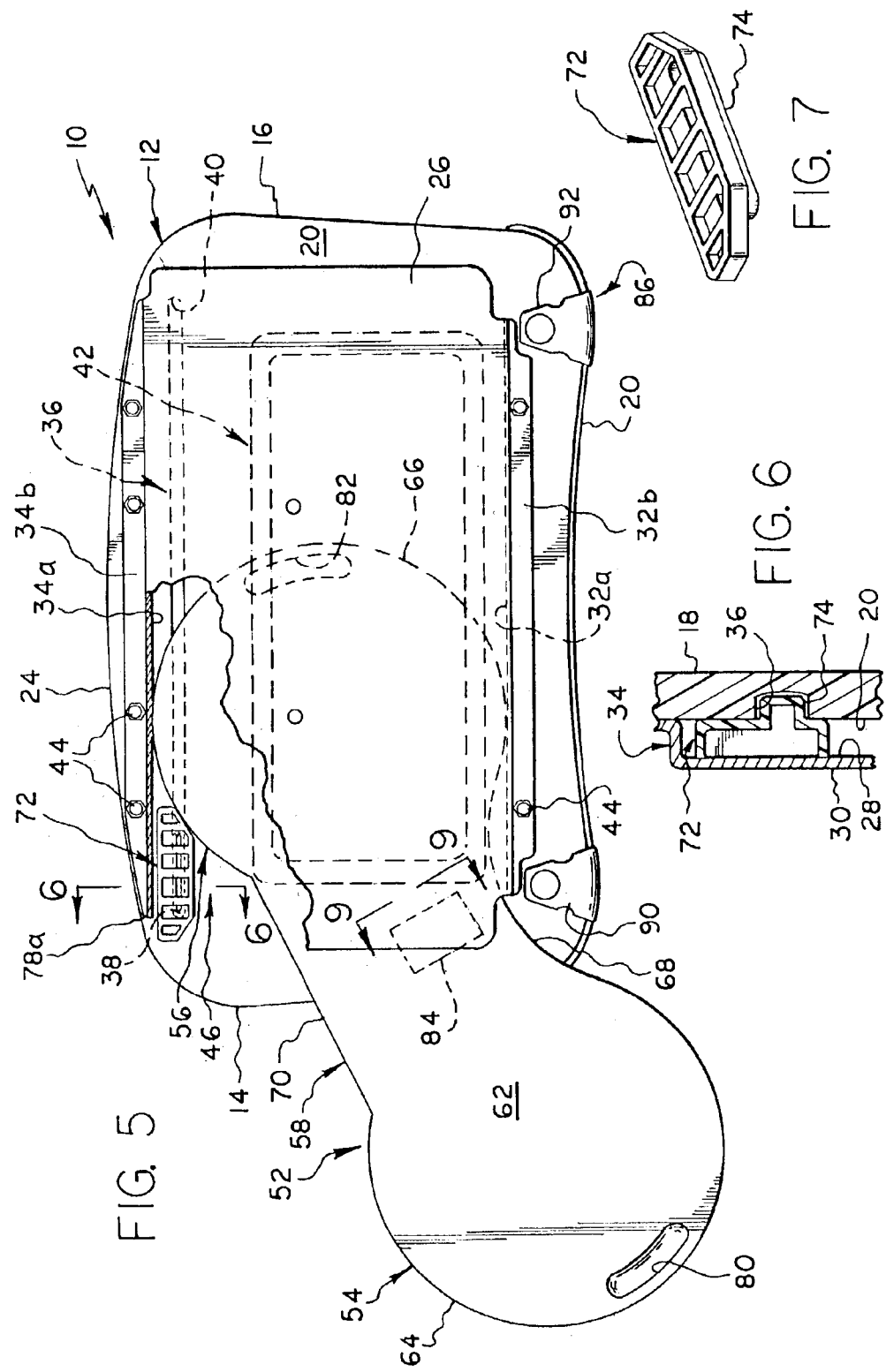

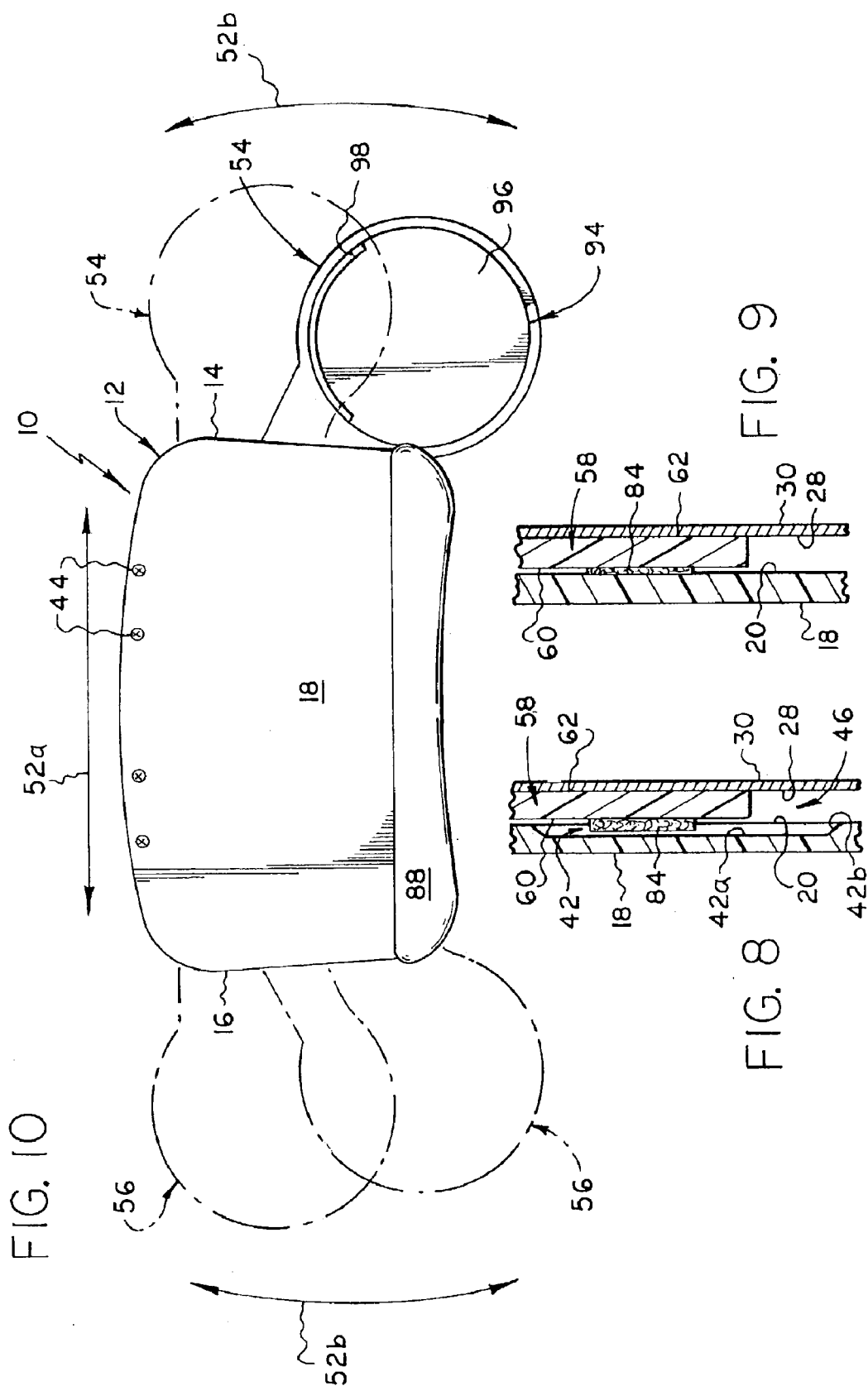

SLIDING KEYBOARD TRAY SET

FIELD OF THE INVENTION

The present invention relates to computer keyboard supports and more particularly to keyboard supports having adjustably positioned support means for supporting a computer input device, such as a mouse.

BACKGROUND OF THE INVENTION

It has heretofore been proposed to provide a keyboard support with a slidably mounted mouse support having a storage position arranged beneath the keyboard support and right and left hand use positions projecting from opposite ends of the keyboard support, as evidenced for example by U.S. Design Pat. No. 380,462, and U.S. Pat. Nos. 5,655,743; 5,732,910; 5,901,934; and 6,045,098.

A drawback of each of the known prior keyboard supports of the type described is that the use positions of the mouse support are not adjustable in a direction extending normal to the front and rear edges of the keyboard support, as required to arrange a mouse in a range of positions convenient to a user.

SUMMARY OF THE INVENTION

The present invention relates to an improved keyboard support of the type having a mouse support movable into right and left hand use positions projecting from opposite ends of the keyboard support.

More particularly, the invention is directed to a keyboard support including a mouse support adapted to be swung forwardly and rearwardly of the keyboard support while in both of its right and left hand use positions in order to provide a range of use positions convenient to a user.

BRIEF DESCRIPTION OF THE DRAWINGS

FIG. 5 is a bottom plan view thereof partially broken away to illustrate internal construction;

FIG. 6 is a sectional view taken generally along the line 6—6 in FIG. 5;

FIG. 7 is a perspective view of the follower shown in FIGS. 5 and 6;

FIG. 8 is a sectional view taken generally along the line 8—8 in FIG. 2;

FIG. 9 is a sectional view taken generally along the line 9—9 in FIG. 5; and

FIG. 10 is a top plan view of the keyboard support with alternative use positions of the mouse support shown in full and broken line.

DETAILED DESCRIPTION OF THE PREFERRED EMBODIMENT

Figure 1:
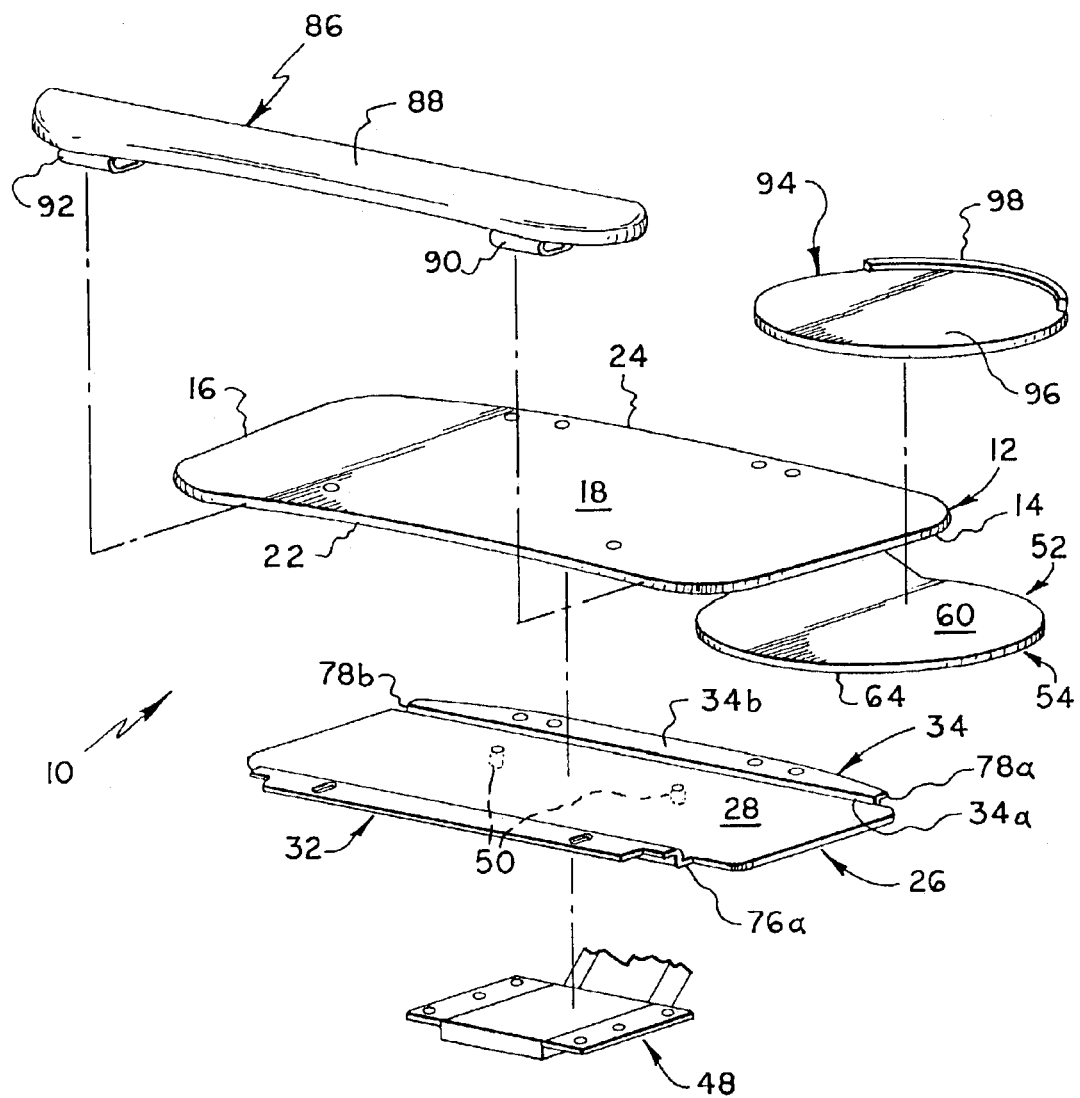
FIG. 1 is an exploded, perspective view of the keyboard support incorporating the present invention.

A keyboard support of the present invention is generally designated as 10 in FIGS. 1–5 and shown as including a generally rectangular tray 12 having opposite ends 14 and 16, a planar upper surface 18 sized to support a computer keyboard, not shown, a lower surface 20, and front and rear edges 22 and 24, respectively; and a bracket 26 having generally rectangular upper and lower surfaces 28 and 30, respectively, and inverted, L-shaped front and rear edge flanges 32 and 34, respectively, defining parallel, facing edge surfaces 32a and 34a, respectively, and mounting flange portions 32b and 34b.

Figure 2:
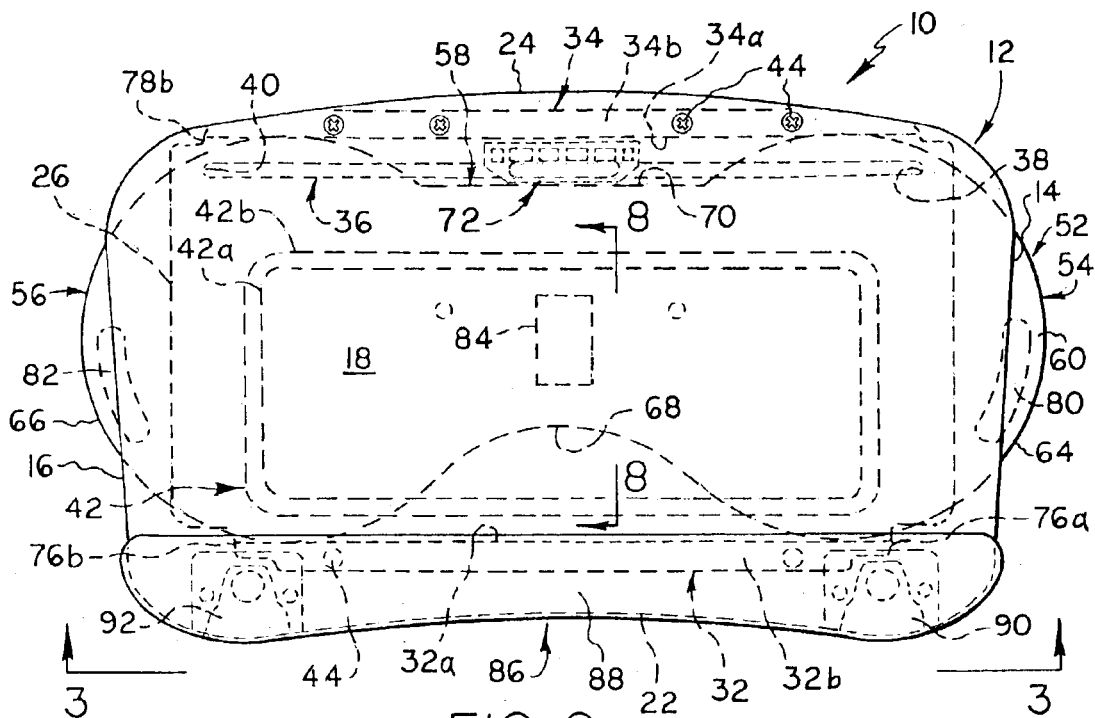
FIG. 2 is a top plan view thereof with a mouse support disposed in storage position.
Figure 3:
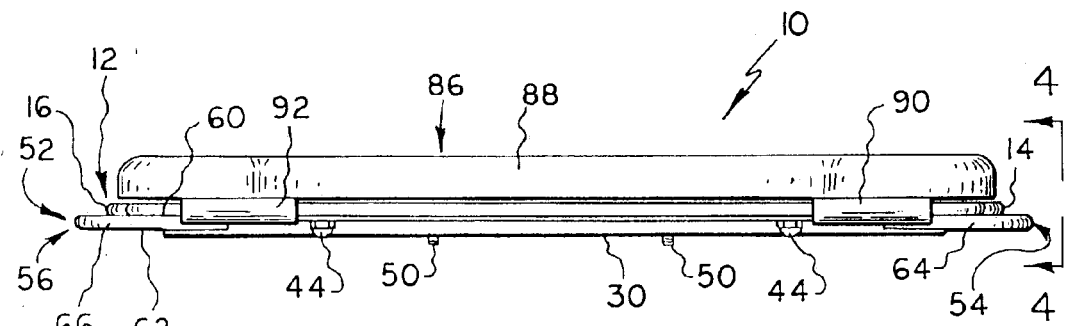
FIG. 3 is a front elevational view thereof.
Figure 4:
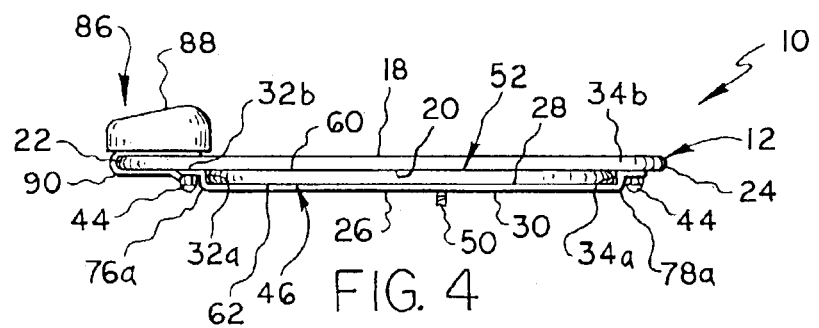
FIG. 4 is an end elevational view thereof, as viewed from the right of FIG. 1.

Tray lower surface 20 is shown in FIGS. 4, 5 and 6 as being provided with a guideway, such as may be defined by an elongated slot 36, having opposite ends 38 and 40 disposed relatively adjacent tray ends 14 and 16; and in FIGS. 2, 5 and 8 as being provided with a generally rectangular recess 42 having a recessed planar surface 42a disposed parallel to lower surface 20 and a peripheral ramp surface 42b joining surface 42a to lower surface 20.

By referring to FIGS. 2, 4 and 5, it will be understood that bracket 26 is suitably fixed to tray 12, such as by fasteners 44 passing through bracket mounting flange portions 32b and 34b upwardly into the tray through lower surface 20, whereby to form an elongated, open-ended passageway 46, which is arranged to extend lengthwise of tray 12 between its opposite ends 14 and 16 and is bounded by parallel tray lower surface 20 and bracket upper surface 28 and parallel edge surfaces 32a and 34a.

Keyboard support 10 may be mounted at a computer work station, not shown, by suitable means, such as by a mounting mechanism shown in part at 48 by fasteners 50 depending from lower bracket surface 30.

In accordance with the present invention, a mouse support 52 is intended to be received within passageway 46 for sliding movement lengthwise thereof, as indicated by arrow 52a in FIG. 10, from a storage position shown in FIG. 2 in which it is disposed beneath and in alignment with tray 12, alternatively into right and left hand use positions shown in FIG. 10, and when in such use positions swung forwardly and rearwardly of tray 12 within a range of travel, as indicated by arrows 52b in FIG. 10.

Mouse support 52 is in the form of a flat, elongated plate having enlarged, mouse supporting end portions 54 and 56 joined by a reduced width waist portion 58.

End portions 54 and 56, and waist portion 58 have oppositely facing upper and lower surfaces 60 and 62 arranged to slidably engage with tray lower surface 20 and bracket upper surface 28. End portions 54 and 56 are further provided with arcuate peripheral edge surfaces 64 and 66, respectively, which extend vertically between upper and lower surfaces 60 and 62; and waist portion 58 is further provided with edge surfaces 68 and 70, which extend between the ends of arcuate edge surfaces 64 and 66 and vertically between upper and lower surfaces 60 and 62.

Arcuate edge surfaces 64 and 66 slidably engage with facing surfaces 32a and 34a, as shown in FIG. 2 for purposes of mounting mouse support 52 for sliding movement lengthwise of passageway 46 from its illustrated storage position alternatively into its right and left hand use positions shown in FIG. 10. Arcuate edge surfaces 64 and 66 also rotatably engage with facing surfaces 32a and 34a, as shown for the case of edge surface 66 in FIG. 5, for purposes of mounting mouse support 52 for rotatable or swinging movement when in its right and left hand use positions.

The extent of sliding movement of mouse support 52 may be determined by providing abutment means adapted to alternatively engage with arcuate edge surfaces 64 and 66. The abutment means may be defined for example by a follower 72 having an elongated guide flange 74 slidably received within guide slot 36 for movement alternatively between slot ends 38 and 40. Guide flange 74 is maintained within slot 36, due to sliding engagement of follower 72 with bracket surface 28, as best shown in FIG. 6.

The forward extent of swinging movement of mouse support 52 may be determined by providing abutments, such as edge 76a of facing edge surfaces 32a, that interface with waist edge surface 68. The rearward extent of swinging movement of mouse support 52 may be determined by providing abutments, such as an edge of follower 72, that interface with waist edge surface 70. Further, as best shown in FIG. 5, waist edge surfaces 68 and 70 may be differently configured in order to permit a greater degree of forward swinging movement of mouse support 52 than rearwardly swinging movement thereof relative to its storage position shown in FIG. 2. Lower surface 62 of end portions 54 and 56 may be formed with user finger receiving recesses 80 and 82 in order to facilitate user induced movements of mouse support 52 into its use positions.

It is preferable to provide friction braking means to frictionally brake swinging movement of mouse support 52, when in its right and left hand use positions, while permitting relatively free sliding movement of the mouse support lengthwise of passageway 46 from such use positions into and from its storage position. The friction braking means may include a pad 84 formed of a suitable friction material, which is fixed to upper surface 60 of waist 58 and arranged for alignment with recess 42, during at least a substantial portion of the extent of sliding movement of mouse support 52 within passageway 46, such that there is no or little frictional contact with recess surface 42a and the mouse support is slidably movable with a minimum of frictional interference. Then, as mouse support 52 approaches its use positions, pad 84 rides up peripheral ramp surface 42b and then into engagement with tray lower surface 20 in order to effect compression of the pad between surfaces 20 and 60, and thus create frictional effects opposing swinging movements of the mouse support.

Keyboard support 10 is preferably provided with a wrist support 86 defined by an elongated resiliently deformable wrist supporting cushion 88 and a pair of resiliently deformable, generally C-shaped clamps 90 and 92 adapted to clampingly engage with tray surfaces 18 and 20 adjacent front edge 22 for removably positioning the cushion to extend lengthwise of tray 12.

If desired, a mouse, not shown, may be supported by surface engagement directly with surface 60 of mouse supporting end portions 54 and 56 when in their respective use positions. It is, however, preferable to provide a suitable, resiliently deformable mouse pad 94, which is adapted to be removably and alternatively supported by mouse supporting end portions 54 and 56. Pad 94 may be variously shaped, but would preferably include a circular, mouse supporting bottom pad element 96 and an arcuate, upstanding fence 98.

What is claimed is:

1. In a keyboard support mounting at least one mouse support, wherein one of said at least one mouse support comprises a single mouse support configured for movement endwise of the keyboard support between use positions projecting from opposite ends of the keyboard support, the improvement comprising in combination:
   said mouse support being mounted on said keyboard support for swinging movement of said single mouse support while in said use positions.

2. The improvement of claim 1 wherein said swinging movement of said single mouse support is forward of said keyboard support.

3. The improvement of claim 1 wherein said swinging movement of said single mouse support is rearward of said keyboard support.

4. The improvement of claim 1, wherein said single mouse support is an elongated plate having enlarged mouse supporting end portions and a narrow waist portion joining said end portions.

5. The improvement of claim 4, wherein said end portions have arcuate edge portions and said keyboard support has essentially parallel guide means spaced apart for slidable and rotatable engagement with said arcuate edge portions.

6. The improvement of claim 5, wherein said guide means have opposite ends arranged to engage with said waist portion for limiting the extent of said swinging movement of said single mouse support in said use positions.

7. The improvement of claim 6, wherein abutment means are provided to limit the extent of movement of said single mouse support lengthwise of said keyboard support.

8. The improvement of claim 7, wherein said abutment means includes a slot extending lengthwise of said keyboard support and a follower supported for sliding movement lengthwise of said slot between opposite ends thereof, and said follower alternatively engaging with said mouse supporting end portions when at said opposite ends of said slot to limit the extent of movement of said single mouse support lengthwise of said keyboard support.

9. The improvement of claim 7, wherein said abutment means includes an elongated guide means extending lengthwise of said keyboard support and provided with opposite ends disposed adjacent said opposite ends of said keyboard support, and a follower slidably engaging with said elongated guide means for movement between said opposite ends of said elongated guide means, and said follower engaging with said mouse supporting end portions when adjacent said opposite ends of said elongated guide means for limiting the extent of movement of said single mouse support lengthwise of said keyboard support.

10. The improvement of claim 1, wherein said keyboard support has an open ended passageway extending lengthwise of said keyboard support and through said opposite ends thereof, said passageway having upper and lower guide surfaces and front and rear guide surfaces, said front and rear guide surfaces having opposite ends adjacent said opposite ends of said keyboard support; and said single mouse support is an elongated plate having enlarged mouse supporting end portions and a narrow waist portion joining said end portions, said end portions and waist portion having parallel oppositely facing surfaces slidably engaging with said upper and lower guide surfaces, said end portions having arcuate edge portions extending between said oppositely facing surfaces, said waist portion having edge portions end connected to said arcuate edge portions, said arcuate edge portions slidably and rotatably engaging with said front and rear guide surfaces to permit sliding movement of said single mouse support and swinging movement of said mouse supporting end portions forwardly and rearwardly of said keyboard support while said single mouse support is in said use positions.

11. The improvement of claim 10, wherein said edge portions of said waist portion engage with said opposite ends of said front and rear guide surfaces for limiting the extent of said swinging movement of said single mouse support in said use positions.

12. A keyboard support comprising:
   a keyboard tray having opposite ends, an upper surface for supporting a keyboard, a lower surface, and front and rear edges;

a bracket fixed to said keyboard tray and having an upper surface and front and rear edge surfaces extending lengthwise of said tray and having opposite ends thereof disposed adjacent said opposite ends of said tray, said upper and edge surfaces of said bracket cooperating with said lower surface of said tray to define an open ended passageway extending lengthwise of said tray;

an elongated mouse support arranged within said passageway and having enlarged mouse supporting end portions and a waist portion joining said end portions, said end and waist portions having oppositely facing surfaces slidably engaging with said lower surface of said tray and said upper surface of said bracket, said end portions having arcuate edge surfaces extending between said oppositely facing surfaces, said waist portion having edge surfaces extending between said oppositely facing surfaces and end joined to said arcuate edge surfaces, said arcuate edge surfaces slidably and rotatably engaging with front and rear edge surfaces of said bracket for permitting sliding movement of said mouse support lengthwise of said passageway to alternatively position said mouse supporting end portions in use positions projecting outwardly of said opposite ends of said tray and allowing swinging movements of said mouse supporting end portions parallel to said lower surface of said tray and upper surface of said bracket while in said use positions, a front edge surface of said waist portion engaging with said opposite ends of said front edge surfaces of said bracket for limiting the extent of swinging movements of said mouse supporting end portions; and abutment means for limiting the extent of said sliding movement of said mouse support lengthwise of said passageway.

13. A keyboard support according to claim 12, wherein said abutment means includes a guideway extending lengthwise of said passageway and having opposite ends, and a follower engaging with said guideway for movement lengthwise of said passageway between said opposite ends of said guideway, and said mouse supporting end portions alternatively engage with said follower when adjacent said opposite ends of said guideway to limit said extent of said sliding movement.

14. A keyboard support according to claim 13, wherein said guideway is an elongated slot formed in said lower surface of said tray and said follower has a projection slidably received in said slot and an oppositely facing surface slidably engaging with said upper surface of said bracket.

15. A keyboard support according to claim 12, wherein said lower surface of said tray is formed with a recess and a friction pad is fixed to that one of said oppositely facing surfaces of said waist portion arranged to face said lower surface of said tray, and said recess and said friction pad are sized and arranged to provide for frictional engagement of said pad with said tray for frictionally braking said swinging movements of said mouse supporting end portions when in said use positions, while providing for relatively free sliding movement of said tray lengthwise of said passageway.

16. A keyboard support according to claim 15, wherein said abutment means includes a guideway extending lengthwise of said passageway and having opposite ends, and a follower engaging with said guideway for movement lengthwise of said passageway between said opposite ends of said guideway, and said mouse supporting end portions alternatively engage with said follower when adjacent said opposite ends of said guideway to limit said extent of said sliding movement.

17. A keyboard support according to claim 16, wherein said guideway is an elongated slot formed in said lower surface of said tray and said follower has a projection slidably received in said slot and an oppositely facing surface slidably engaging with said upper surface of said bracket.

18. A keyboard support according to claim 17, wherein that one of said oppositely facing surfaces facing said upper surface of said bracket is formed with a pair of user finger receiving recesses disposed one in association with each of said mouse supporting portions for facilitating user induced movements of said mouse support relative to said tray.

19. A keyboard support according to claim 18, wherein a user wrist support is provided in combination and includes an elongated resiliently deformable cushion and resiliently deformable generally C-shaped clamps for removably engaging with said upper and lower surfaces of said tray adjacent said front edge thereof for removably mounting said cushion above said upper surface of said tray to extend lengthwise of said front edge thereof.

20. A keyboard support according to claim 19, wherein a resiliently deformable mouse pad is provided in combination and adapted to be removably and alternatively supported by said mouse supporting portions.

* * * * *

UNITED STATES PATENT AND TRADEMARK OFFICE
CERTIFICATE OF CORRECTION

| | | |
|---|---|---|
| PATENT NO. | : 6,912,119 B2 | |
| APPLICATION NO. | : 10/387081 | |
| DATED | : June 28, 2005 | |
| INVENTOR(S) | : Eric W. Maloney | |

It is certified that error appears in the above-identified patent and that said Letters Patent is hereby corrected as shown below:

In Claim 1, line 61, the word "single" was omitted before the first recitation of "mouse support." A corrected version of Claim 1, lines 55 to 63 is presented below.

1. In a keyboard support mounting at least one mouse support, wherein one of said at least on mouse support comprises a single mouse support configured for movement endwise of the keyboard support between use positions projecting from opposite ends of the keyboard support, the improvement comprising in combination:
said single mouse support being mounted on said keyboard support for swinging movement of said single mouse support while in said use positions.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,912,119 B2
APPLICATION NO. : 10/387081
DATED : June 28, 2005
INVENTOR(S) : Eric W. Maloney It is certified that error appears in the above-identified patent and that said Letters Patent is hereby corrected as shown below:

In Claim 1, line 61, the word "single" was omitted before the first recitation of "mouse support." A corrected version of Claim 1, lines 55 to 63 is presented below.

1. In a keyboard support mounting at least one mouse support, wherein one of said at least one mouse support comprises a single mouse support configured for movement endwise of the keyboard support between use positions projecting from opposite ends of the keyboard support, the improvement comprising in combination:
    said single mouse support being mounted on said keyboard support for swinging movement of said single mouse support while in said use positions.

This certificate supersedes Certificate of Correction issued December 19, 2006.

Signed and Sealed this

Twelfth Day of June, 2007

JON W. DUDAS
*Director of the United States Patent and Trademark Office*